US007481204B2

(12) United States Patent
Sullivan

(10) Patent No.: US 7,481,204 B2

(45) Date of Patent: Jan. 27, 2009

(54) INTERNAL COMBUSTION ENGINE FLOW REGULATING VALVE

(75) Inventor: Michael Brian Sullivan, Waterloo, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 11/768,316

(22) Filed: Jun. 26, 2007

(65) Prior Publication Data

US 2009/0000600 A1 Jan. 1, 2009

(51) Int. Cl.
*F02M 37/04* (2006.01)
*F16K 15/00* (2006.01)

(52) U.S. Cl. .................. 123/514; 123/457; 137/516.25

(58) Field of Classification Search ................ 123/457, 123/458, 459, 460, 462, 510, 511, 514; 137/516.25
See application file for complete search history.

(56) References Cited

U.S. PATENT DOCUMENTS 1,807,594 A * 6/1931 Hopkins .................... 137/535
3,165,097 A * 1/1965 Lowther .................... 123/574
3,198,208 A * 8/1965 Tramontini ................ 137/480
3,683,957 A * 8/1972 Sands ..................... 137/460
4,503,885 A * 3/1985 Hall ...................... 137/574
4,926,829 A * 5/1990 Tuckey .................... 123/497
5,027,919 A * 7/1991 Silva et al. .............. 181/241
5,285,759 A * 2/1994 Terada et al. ............. 123/514
5,873,349 A * 2/1999 Tuckey et al. ............. 123/514
5,890,518 A * 4/1999 Fischerkeller .............. 138/45
6,065,453 A * 5/2000 Zych ...................... 123/514
6,142,127 A * 11/2000 Maass ..................... 123/514
6,622,701 B2* 9/2003 Endo ...................... 123/467
7,040,300 B2* 5/2006 Jeong ..................... 123/514

* cited by examiner

*Primary Examiner*—Thomas N Moulis

(57) ABSTRACT

A flow regulating valve for a diesel engine in which a unitary valve element has three positions for controlling flow from a unit injector fuel injection system in response to valve inlet pressure. The valve has a first position wherein flow is blocked below about 10 psi, a second position between about 10 psi and 20 psi wherein flow is substantially unrestricted, and a third position above about 20 psi wherein flow is restricted to minimize return flow to a fuel supply and minimize fuel cooling requirements.

21 Claims, 4 Drawing Sheets

INTERNAL COMBUSTION ENGINE FLOW REGULATING VALVE

FIELD OF THE INVENTION

The invention relates to internal combustion engines and more particularly to flow regulating valves for such engines.

BACKGROUND OF THE INVENTION

Internal combustion engines of the diesel type are an essential part of the automotive and agriculture industries. The fundamental diesel process depends upon the heat of compression to ignite an air fuel mixture where fuel has been injected at or near top dead center during the compression stroke of the engine. Over the years, a wide variety of systems have been proposed and adopted to achieve the end of a predetermined quantity of fuel under high pressure at a predetermined time in the engine cycle to achieve the necessary performance and emission goals for the diesel engine. These fuel systems include high pressure common rail systems (HPCR), unit injectors, distributor systems, and multiple unit injector pump systems. One of the common requirements of all such systems is the ability to have a solid column of fuel from a fuel supply to the fuel injection system, i.e. no trapped air in the fuel supply. This is necessary to provide the correct quantity and timing of injected fuel but also to lubricate the close tolerance moving parts of the fuel injection system.

To this end, it is necessary to rapidly fill the line from a fuel supply to the fuel injection system prior to engine startup so that initial operation is on the basis of a solid column of fuel in the system. At the same time, the fuel supply to the fuel injection system must not be above certain flow levels during engine operation since most fuel injection systems have a return flow feature for fuel that is not consumed by the engine. The process of pressurizing fuel for delivery to the combustion chambers of an engine produces heat which is transferred to the fuel. Any fuel, not consumed by the engine, goes back to the fuel tank. In the event of an excess of fuel passing to the fuel injection system, the heat input to the fuel can be significant and require fuel coolers to avoid the adverse consequences of fuel that has been heated to a significant temperature.

In no system is the requirement for a solid column of fuel more important than in the class of fuel system comprising unit injectors in which the injection pressure is derived from a cam actuated plunger to achieve ultra high injection pressures. In such a system, a common inlet passage or chamber is positioned adjacent each of the injectors and solenoid valves control the timing and quantity of fuel admitted to each of the plungers for injection into the engine combustion chamber. Such a system has a pressure adjacent the injectors at a level about 100 psi. Under some conditions, after shut down of the engine, air can enter into the system so that it is possible to have fuel/air or air entering the injection chamber which has an adverse affect on engine performance.

Accordingly, there exists a need in the internal combustion engine art for a fuel system that minimizes, if not eliminates aeration of the fuel but limits return flow under engine operating conditions. Furthermore there exists a need in the art for a simplified unitary valve accomplishing these functions.

SUMMARY OF THE INVENTION

The invention, in one form is a fuel system for an internal combustion engine receiving fuel for operating said engine with a series of timed, quantitatively selected fuel charges. The fuel system has a fuel injection system for pressurizing fuel for delivery to the engine. A supply and a return line extend between the fuel injection system and a fuel supply. At least one pump is interposed in the supply line for receiving fuel from the fuel supply and delivering the flow to the fuel injection system. A flow regulating valve is interposed in the return line. The flow regulating valve includes a housing having an inlet and outlet and a chamber interconnecting said inlet and outlet. A valve element is displaceable in the chamber between a first position wherein flow is blocked, a second position wherein flow is substantially unrestricted, and a third position where flow is restricted, the valve element being displaceable between the positions in response to the inlet pressure at said valve.

The invention, in another form, is a flow regulating valve for a fluid having a housing with an inlet and outlet and a chamber connecting the inlet and outlet. A valve element is displaceable in the chamber between a first position where flow is blocked, a second position where flow is substantially unrestricted and a third position where flow is restricted, the valve element being displaceable between the first, second and third positions as a function of given pressure ranges.

The invention, in still another form, is an internal combustion engine and a fuel supply for operating said engine with a series of timed, quantitatively selected fuel charges. A fuel system has a fuel injection system for pressurizing fuel for delivery to the engine. A supply and a return line extend between the fuel injection system and the fuel supply. At least one pump is interposed in the supply line for receiving fuel from the fuel supply and delivering the flow to the fuel injection system. A flow regulating valve is interposed in the return line. The flow regulating valve includes a housing having an inlet and outlet and a chamber interconnecting said inlet and outlet. A valve element is displaceable in the chamber between a first position wherein flow is blocked, a second position wherein flow is substantially unrestricted, and a third position where flow is restricted, the valve element being displaceable between the positions in response to the inlet pressure at said valve.

DETAILED DESCRIPTION OF THE INVENTION

Figure 1:
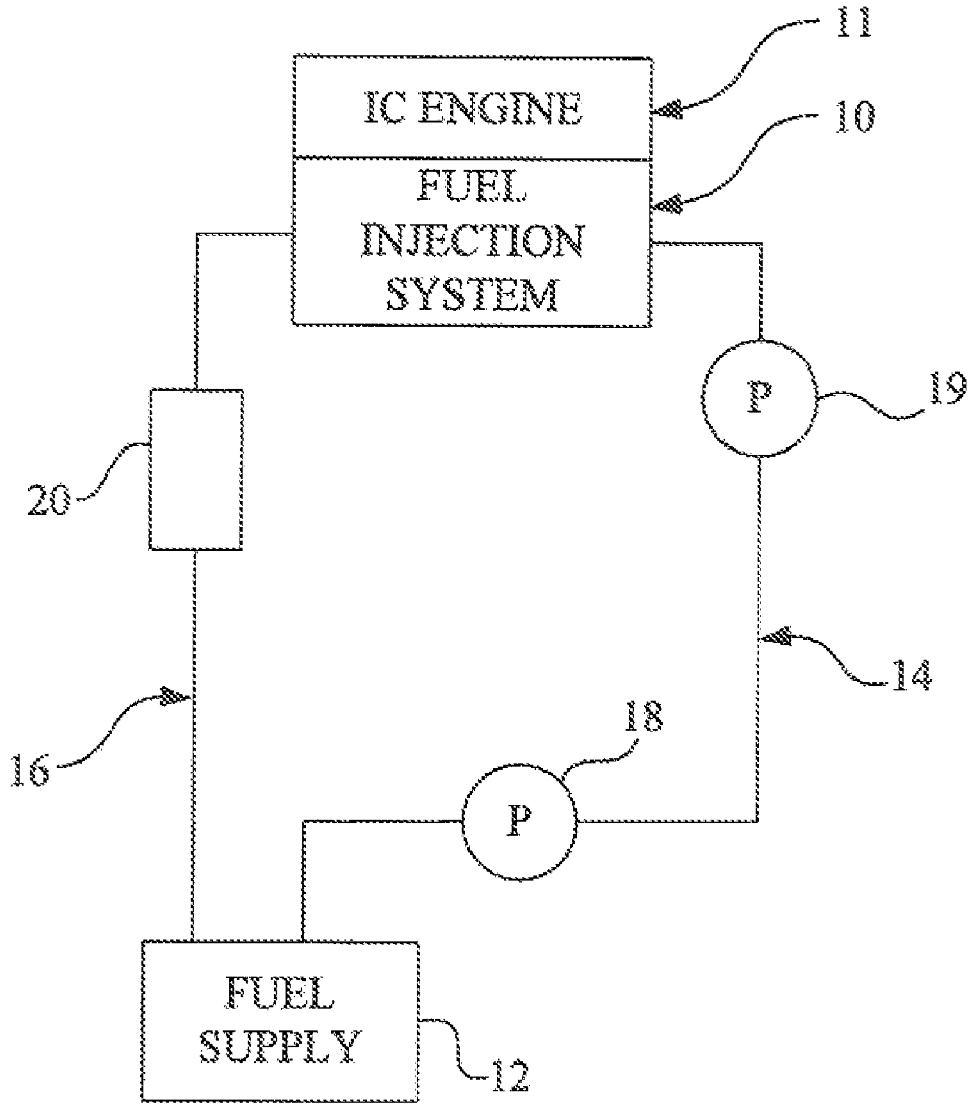
FIG. 1 is a schematic illustration of a fuel system for an internal combustion engine with a valve embodying the present invention.

FIG. 1 shows an internal combustion engine 11 of the diesel type. Engine 11 has a fuel injection system 10 supplied with fuel from an appropriate fuel supply 12 such as a tank by way of a supply line or conduit 14 A priming pump 18 and transfer pump 19 are connected in series in supply conduit 14 to deliver fuel to the fuel injection system 10. A return line or conduit 16 connects excess fuel that has not been consumed by the engine 11 to the fuel supply 12 to complete the loop.

A flow regulating valve 20 is interposed in conduit 16 between the fuel injection system 10 and the fuel supply 12. Although the priming pump 18 is shown away from the fuel supply 12, it should be apparent to those skilled in the art that the pump may be in one of a number of positions.

The fuel injection system 10 may be one of a number of fuel injection systems adaptable for supplying predetermined fuel charges at a predetermined time to the combustion chamber of engine 11. For purpose of illustrating the invention, the fuel injection system 10 is a unit injector system where plungers for individual cylinders receive a fuel charge that is timed and metered by solenoid valves (not shown). The plungers are cam actuated to inject the fuel into the combustion chamber of the engine 11 for compression ignition operation. The solenoid valves permit a control of when the fuel charge is injected and the quantity of the fuel charge. Details of this control system are not shown to simplify the understanding of the present invention. Lines 14 and 16 extend to a common passage or chamber adjacent the internal combustion engine 11 so that any excess fuel not consumed by the individual injectors is passed by way of line 16 to the fuel supply 12. As discussed above, the hydrodynamic process of pressurizing the fuel by the pumps 18 and 19, and passing through the injection system causes a heat increase in the fuel. In order to minimize the need for fuel coolers, the valve 20 is incorporated in the system.

Figure 2:
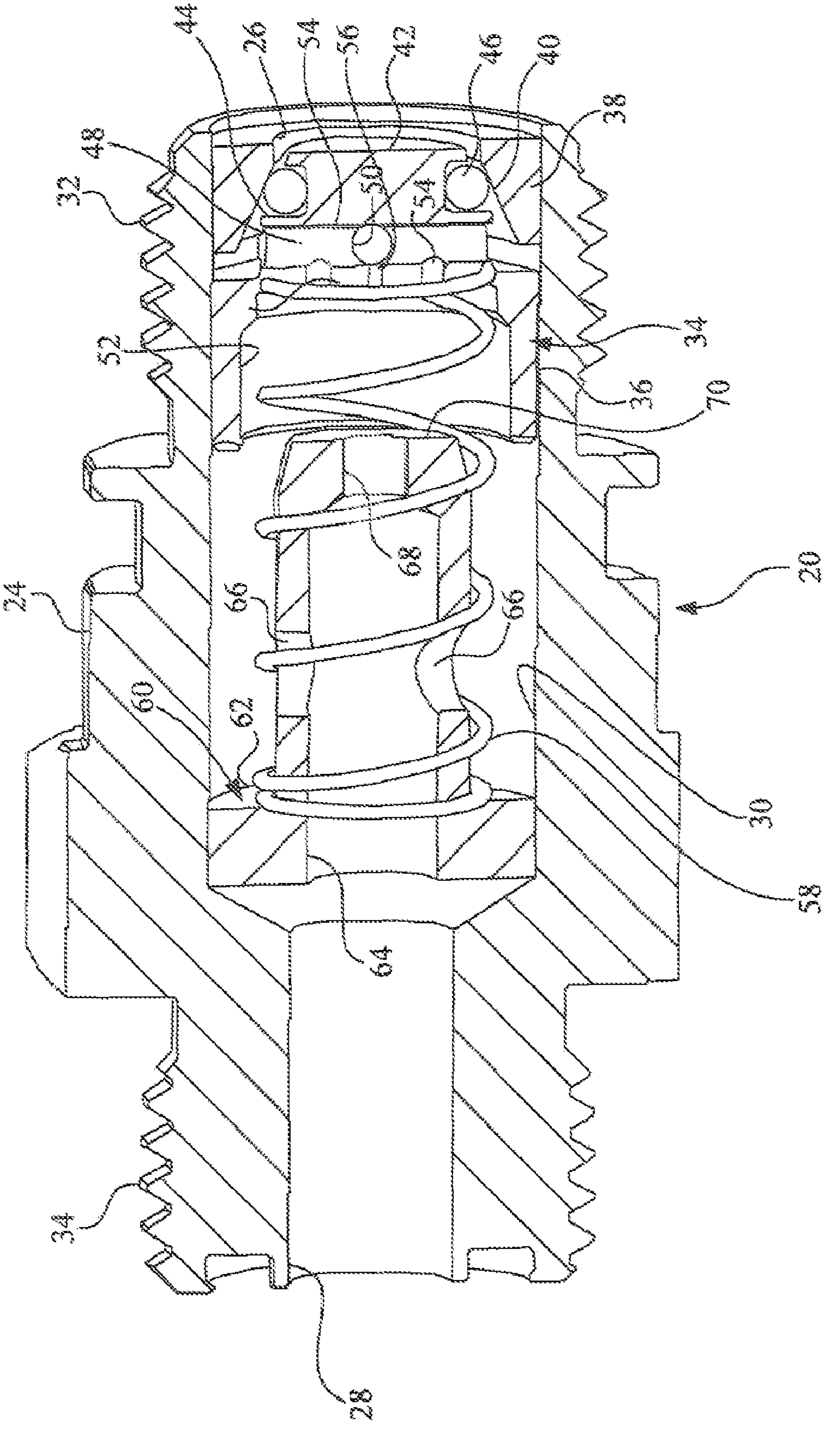
FIG. 2 is a enlarged cross-section view of a flow regulating valve incorporated in FIG. 1 in a first position.

Referring now to FIG. 2, the valve 20 has a housing 24 having an inlet 26 and an outlet 28. A chamber 30, herein illustrated as cylindrical, interconnects inlet 26 and outlet 28. Appropriate threads 32 and 34 respectively connect the upstream and downstream end of valve 20 to the supply line 14. Although the valve 20 is illustrated in the form of a threaded fitting, the valve 20 could also be integrated within another component, such as a fuel filter header or cylinder head casting (not shown), wherein that component would serve at least a portion of the function of the housing 24 in the illustrated embodiment.

A valve element 34 is positioned within cylindrical chamber 30 for linear displacement between the inlet 26 and outlet 28. Valve element 34 has a cylindrical outer diameter 36 to allow free displacement within cylindrical chamber 30. For manufacturing purposes, a seat element 38 is positioned within the upstream end of cylindrical chamber 30. Seat element 38 has a tapered seat 40 leading to inlet 26. Valve element 34 has an upstream end 42 displaceable towards inlet 26 that incorporates an annular groove 44 receiving an appropriate resilient O-ring 46 to provide an effective seal against seat 40 to prevent flow from the inlet 26 to the outlet 28 when the valve element 34 is in a first position as illustrated in FIG. 2.

Valve element 34 has a pair of radial, intersecting passages 48 and 50 which extend from the periphery of valve element 34 radially inward. An annular recess 52 is formed in the interior of valve element 34 and a plurality of axial passages 54 connect radial passages 48 and 50 to the recess 52. A single, central passage 56 connects the intersection of radial passages 48 and 50 to the recess 52. As described later, the cross-sectional flow area of passages 54 individually are greater then the cross-sectional flow area of passage 56 and collectively are approximately eight times the flow area of central passage 56.

The valve element 34 is biased against seat 40 by a coil spring 58 having one end acting against the end wall 53 of recess 52. However, it should be apparent to those skilled in the art, however, that many forms of yieldable biasing components may be employed to hold valve element 34 against seat 40.

As illustrated herein, an annular element 60 is positioned in chamber 30 adjacent outlet 28 and has a flange 62 forming an abutment for the other end of spring 58. Annular element 60 has a central recess 64 open to outlet 28. A plurality of radial passages 66 connect the outer periphery of element 60 to recess 64. A central axial passage 68 extends from recess 64 through an end wall 70 of element 60 to the recess 52 of valve element 34. Central passage 68 is sized and positioned so that it aligns with central passage 56 on valve element 34 but does not overlap or interconnect with passages 54 when valve element 34 abuts element 60 in the position illustrated in FIG. 4.

Figure 3:
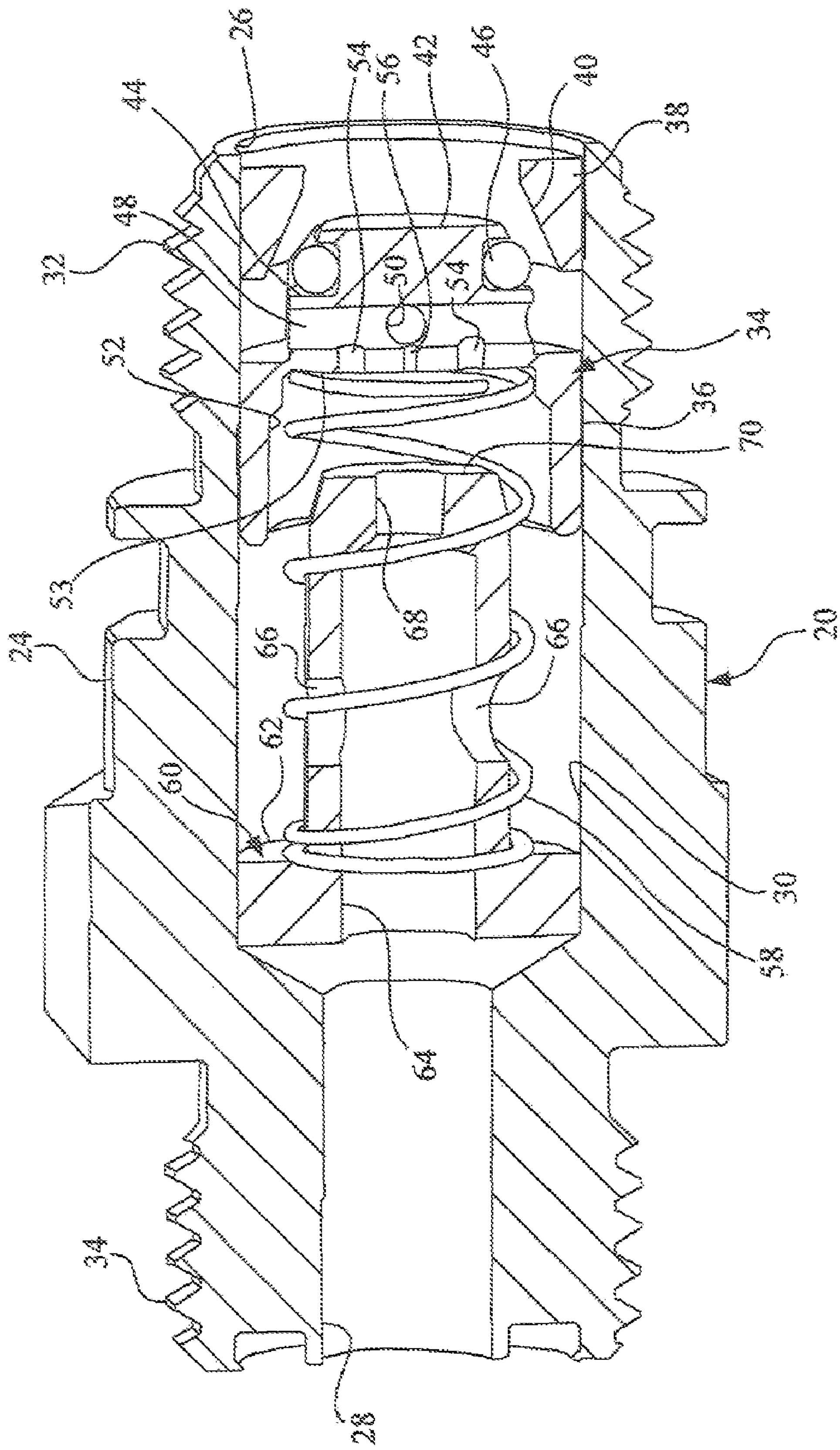
FIG. 3 is an enlarged cross-section view of the valve of FIG. 2 in a second position.

Before engine operation, the valve 20 is in the first position illustrated in FIG. 2 wherein the valve element 34 is against seat 40 to block flow through line 16 to the fuel supply 12 to maintain a residual fuel pressure in the fuel injection system 10, and to prevent fuel from flowing back to the fuel supply 12. The spring constant of the spring 58 and valve areas exposed to the upstream pressure are set so that the valve 34 fully unseats at about ten pounds per square inch (psi) to the second position shown in FIG. 3, where the valve element 34 is in between the position of FIG. 2 and FIG. 4. In the position of FIG. 3, the flow in line 16 passes around the circumference of the valve element 34 and radially inward through passages 48 and 50. The flow then passes through the plurality of passages 54 and the central passage 56 to flow freely to outlet 28 via passages 66 and 68 in element 60.

FIG. 3 shows the valve element 34 in a position intermediate valve seat 40 and the end wall 70 of outlet element 60. The areas exposed to pressure and the spring constant of spring 58 are selected so that in this position between valve seat 40 and end wall 70, the flow through from the inlet 26 to the outlet 20 is substantially fee flowing at pressures from about 10 psi to 20 psi, thus allowing any air trapped in the fuel to be effectively purged to the fuel supply 12.

Figure 4:
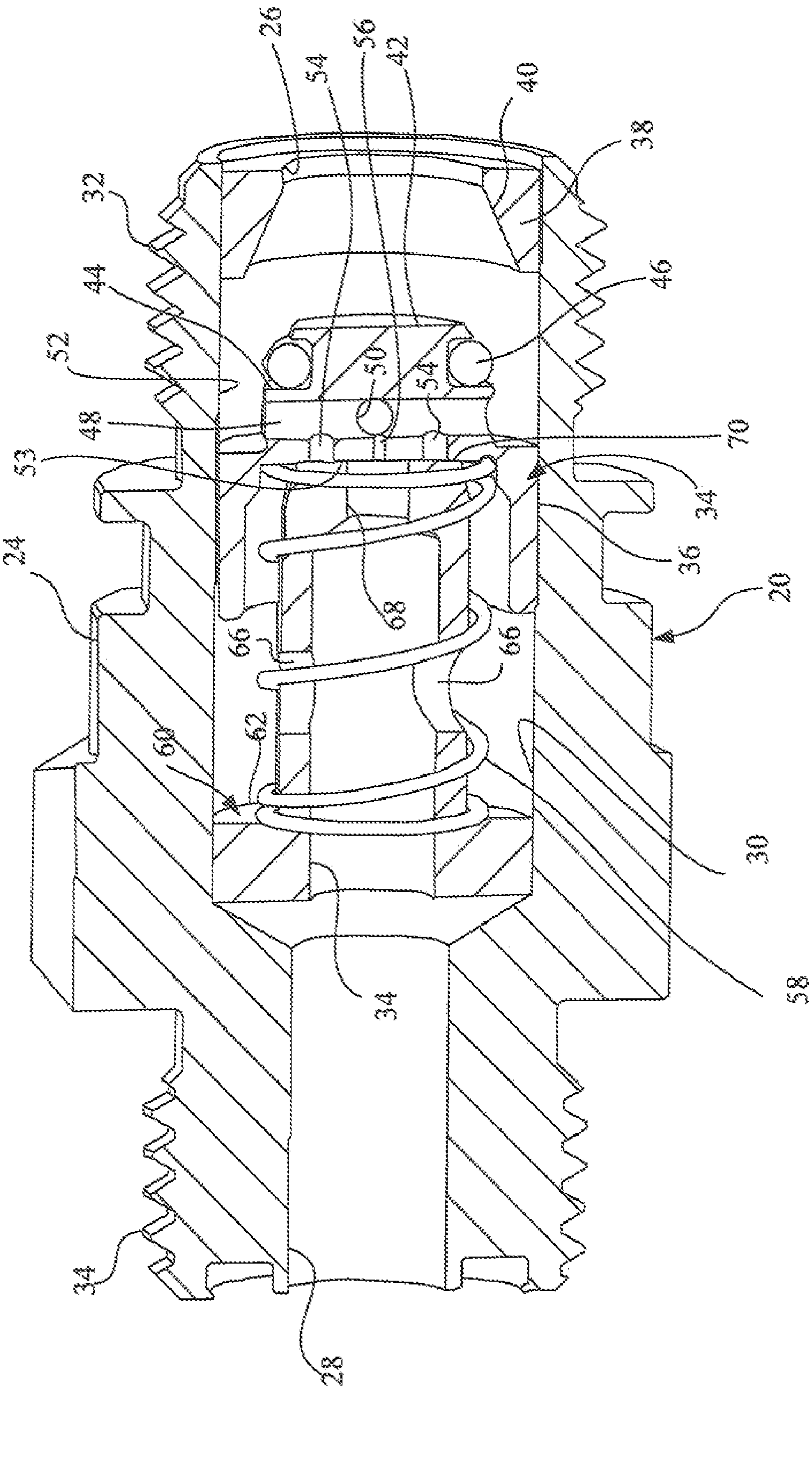
FIG. 4 is an enlarged cross-section view of the valve of FIG. 2 in a third position.

FIG. 4 shows the valve element 34 in its third position wherein the valve element 34 abuts the end wall 70 of outlet element 60 to block flow through passages 54 but permit flow through central passage 56 in valve element 34. This position, which is selected to be at above approximately 20 psi, permits flow on a restricted basis such that fuel is supplied to the fuel injection system at a desired pressure, as a function of the flow rate of the transfer pump 19, and the size of the central passage 56.

Although the values of the pumps 18, 19 and fuel injection system 10 can vary according to the particular type of system and the output of the pressurization device within the fuel injection system, the following values may be found in a system incorporating flow limiting valve 20. As an example of a typical system, the pump 18 can generate 30 psi and a maximum of 0.25 gallons per minute (gpm). The transfer pump 19 within can generate 90 psi and 2 gpm during the running of the engine 11. The valve 20 is sized so that the maximum flow through conduit 16, during operation of engine 11, is below approximately 10 milliliters per second. By making the flow area of passages 54 approximately 8 times the flow area of passage 56, the fuel injection system 10 is quickly purged of air and primed prior to start-up of engine 11, but flow is limited during engine operation. Furthermore, the functions of blocking flow during non-operation to maintain an at-rest minimum fuel system pressure, permitting relatively free flow to purge any entrained air and prime the fuel injection system 10, and the flow limiting feature in the third position illustrated in FIG. 4 are provided by a single, simplified hydro mechanical valve, without the need for complicated electronic algorithms and other sophisticated control systems.

Having described the preferred embodiment, it will become apparent that various modifications can be made without departing from the scope of the invention as defined in the accompanying claims.

The invention claimed is:

1. A fuel system for an internal combustion engine receiving a fuel supply for operating said engine with a series of timed, quantitatively selected fuel charges, said fuel system comprising:

a fuel injection system for pressurizing fuel for delivery to the engine, a supply and a return line extending between said fuel injection system and the fuel supply, at least one pump interposed in said supply line for receiving fuel from the fuel supply and delivering said flow to said fuel injection system, and a flow regulating valve interposed in the return line, said flow regulating valve comprising a housing having an inlet and outlet in a chamber interconnecting said inlet and outlet, and a valve element displaceable in said chamber between a first position wherein flow is blocked, a second position wherein flow is substantially unrestricted, and a third position where flow is restricted, said valve element being displaceable between said positions in response to the inlet pressure at said valve and said second position being between said first and third position.

2. A fuel system as claimed in claim 1, wherein the inlet pressure for the first position is lower than about 10 pounds per square inch (psi).

3. A fuel system as claimed in claim 1, wherein the inlet pressure for said second position is between about 10 and about 20 pounds per square inch (psi).

4. A fuel system as claimed in claim 1, wherein the inlet pressure for said third position is greater than about 20 pounds per square inch (psi).

5. A fuel system as claimed in claim 1, wherein said valve is yieldably urged to said first position against pressure at the inlet to said housing.

6. A fuel system as claimed in claim 5, further comprising a spring for yieldably urging said valve element toward said first position.

7. A fuel system as claimed in claim 1, wherein the flow area through said valve is a first level for the second position of said valve assembly and the flow area through said valve for the third position is smaller than the flow area in said second position.

8. A fuel system as claimed in claim 7, wherein the flow area in said second position is approximately eight times greater than the flow area for said third position.

9. A fuel system as claimed in claim 1, wherein said housing has a cylindrical chamber and has a valve seat, said valve element being displaceable against said valve seat blocking flow therethrough in said first position.

10. A fuel system as claimed in claim 9, wherein said valve element is biased towards said first position.

11. A fuel system as claimed in claim 10, further comprising a spring for biasing said valve element towards said first position.

12. A fuel system as claimed in claim 11, further comprising an O-ring on said valve element for abutting said valve seat in said first position.

13. A fuel system as claimed in claim 9, wherein said valve element has passages exposed to communicate the inlet of said housing to said outlet when said valve is away from said first position.

14. A fuel system as claimed in claim 13, wherein said valve element has a plurality of passages all of which permit flow to said outlet in said second position and permit flow to said outlet only through one of said passages when said valve element is in said third position.

15. A fuel system as claimed in claim 14, further comprising an annular outlet element positioned in said chamber between said valve element and the housing outlet, said outlet element having an end wall positioned to abut said valve element when said valve element is in said third position, said outlet element having a central recess open to said housing outlet and an axial central passage through said end face, said outlet element having a plurality of radial passages from the central recess to the outer circumference of said valve element, the passages in said valve element being positioned so that flow to the outlet of said housing is only through one of said passages and through said axial central passage of said outlet element.

16. A flow regulating valve for a fluid, said valve comprising:

a housing having an inlet and outlet and a chamber interconnecting said inlet and outlets;

a valve element displaceable in said chamber between a first position wherein flow is blocked, a second position wherein flow is substantially unrestricted; and a third position wherein flow is restricted, said valve element being displaceable between said first, second and third positions as a function of given pressure ranges and said second position being between said first position and said third position.

17. A flow regulating valve as claimed in claim 16, wherein the pressure for said first position is below about 10 pounds per square inch (psi), the pressure for said second position is between approximately 10 pounds per square inch and 20 pounds per square inch (psi) and the pressure for said third range is above approximately 20 pounds per square inch (psi).

18. A flow regulating valve as claimed in claim 16, wherein the flow area through said flow regulating valve has a first value for said second position and a second value for said third position, said third position being smaller than said second position.

19. A flow regulating valve as claimed in claim 18, wherein the flow area for said second position is approximately eight times greater than the flow area for said third position.

20. An engine system comprising:

an internal combustion engine, a fuel supply, a fuel injection system for receiving fuel from said fuel supply and delivering a series of timed, quantitatively selected fuel charges to said engine under pressure, a supply and a return line extending between said fuel injection system and the fuel supply, at least one pump interposed in said supply line for receiving fuel from the fuel supply and delivering said flow to said fuel injection system, and a flow regulating valve interposed in the return line, said flow regulating valve comprising a housing having an inlet and outlet in a chamber interconnecting said inlet and outlet, and a valve element displaceable in said chamber between a first position wherein flow is blocked, a second position wherein flow is substantially unrestricted, and a third position where flow is restricted, said valve element being displaceable between said positions in response to the inlet pressure at said valve and said second position being between said first and third positions.

21. An engine system as claimed in claim 20 wherein said valve is interposed in said return line.

* * * * *